(No Model.)

H. J. BRUHN.
TWO WHEELED VEHICLE.

No. 305,734. Patented Sept. 30, 1884.

Witness,
E. W. Laird
A. J. Marvin

Inventor,
Henry J. Bruhn
By Geo. W. Tibbitts Atty.

UNITED STATES PATENT OFFICE.

HENRY J. BRUHN, OF CLEVELAND, OHIO.

TWO-WHEELED VEHICLE.

SPECIFICATION forming part of Letters Patent No. 305,734, dated September 30, 1884.

Application filed July 27, 1883. Renewed June 21, 1884. (No model.)

*To all whom it may concern:*

Be it known that I, HENRY J. BRUHN, of Cleveland, in the county of Cuyahoga and State of Ohio, have invented certain new and useful Improvements in Two-Wheeled Vehicles, of which the following is a specification.

These improvements relate to two-wheeled vehicles drawn by horses, and have for their object to provide an easy and pleasant riding cart, free from the jolting and oscillating motion imparted to the rider common to the carts now in use. This objection I overcome by the peculiar construction of spring attachment of the shafts to the running-gear and body of my vehicle, as hereinafter described and claimed.

Figure 1:
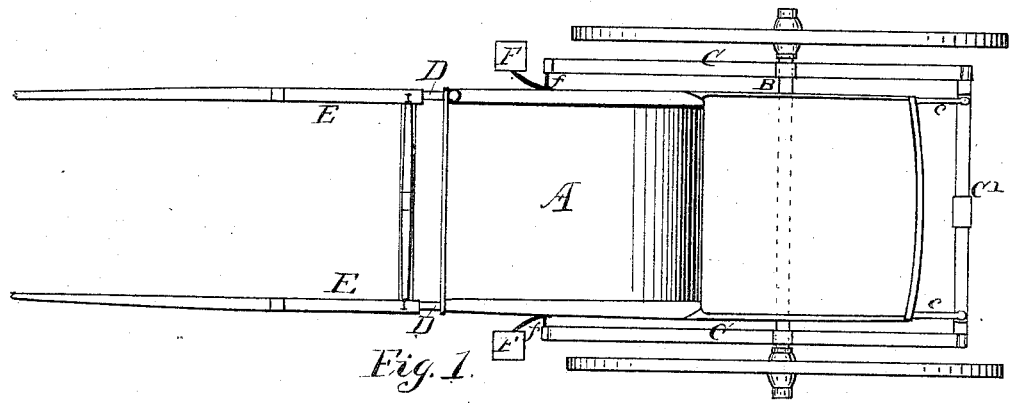
Figures 2, 3:
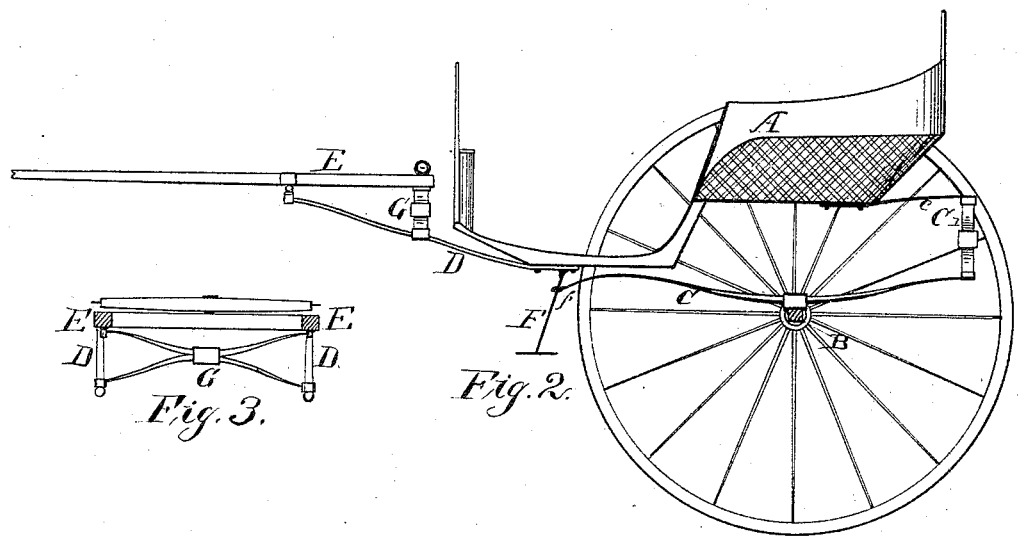

In the accompanying drawings, Figure 1 is a top or plan view. Fig. 2 is a side elevation. Fig. 3 is a front view of the spring and shaft attachment.

A is the body of the vehicle, which may be of any of the forms now in use. B is the axle, to which is attached the two side half-elliptic springs, C C, whose rear ends are attached to the cross-springs C'. This forms, with the wheels, the main part of the running-gear.

To the front corners of the body are attached two bars, D D, which extend forward and are attached at their forward ends by a joint to the under side of the shafts E. The rear end of the body is attached to the rear springs, C', by loops c. The forward ends of side springs, C C, are attached to an arm, f, on the step-bracket F.

Between the rear end of the shafts E and the bars D D are interposed springs G, which connect said shafts with the running-gear and the body, and are the means of obtaining the desired results before mentioned. By thus attaching the shafts to the vehicle, instead of having them longer and attached to the axle, I entirely overcome that disagreeable jerking and oscillating motion to the body, and instead there is imparted to the rider a pleasant up-and-down motion which appertains to the four-wheeled carriages.

Having described my invention, I claim—

In combination with the rear end of the shafts E and the bars D D, the half-elliptic springs G G, united at their middle, their ends being looped to the shafts and bars, as shown and described.

HENRY J. BRUHN.

Witnesses:
F. W. CADWELL,
GEO. W. TIBBITTS.